US011463549B2

(12) United States Patent
Marzorati et al.

(10) Patent No.: US 11,463,549 B2
(45) Date of Patent: *Oct. 4, 2022

(54) FACILITATING INTER-PROXY COMMUNICATION VIA AN EXISTING PROTOCOL

(71) Applicant: International Business Machines Corporation, Armonk, NY (US)

(72) Inventors: Mauro Marzorati, Lutz, FL (US); Seda Özses, Vienna (AT); Juraj Nyiri, Ivanka pri Nitre (SK); Michael J. Santelia, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/354,918

(22) Filed: Jun. 22, 2021

(65) Prior Publication Data

US 2021/0314414 A1    Oct. 7, 2021

Related U.S. Application Data

(63) Continuation of application No. 16/254,857, filed on Jan. 23, 2019, now Pat. No. 11,153,399.

(51) Int. Cl.
*G06F 13/00* (2006.01)
*H04L 67/561* (2022.01)
(Continued)

(52) U.S. Cl.
CPC ............ *H04L 67/561* (2022.05); *H04L 67/01* (2022.05); *H04L 67/02* (2013.01); *H04L 67/60* (2022.05)

(58) Field of Classification Search
CPC ..... H04L 67/2804; H04L 67/02; H04L 67/32; H04L 67/42; H04L 29/06102;
(Continued)

(56) References Cited

U.S. PATENT DOCUMENTS 6,405,240 B1    6/2002  Tsubone et al.
6,625,624 B1    9/2003  Chen et al.
(Continued)

OTHER PUBLICATIONS

List of IBM Patents or Patent Applications Treated as Related, Jun. 25, 2021, pp. 1-2.
(Continued)

*Primary Examiner* — Kenneth R Coulter
(74) *Attorney, Agent, or Firm* — Robert A. Voigt, Jr.; Shackelford, Bowen, McKinley & Norton, LLP

(57) ABSTRACT

A method, system and computer program product for facilitating inter-proxy communication via an existing protocol. A proxy receives a message (e.g., request message) using a protocol, such as HTTP. If the proxy determines to add proxy relevant information to the message, then the proxy defines a new message header for the inter-proxy communication, which is added to the existing header section of the message. The proxy relevant information is then added in the newly added message header of the message. The message with the proxy relevant information is then transmitted to a subsequent proxy using the protocol of the underlying request-response transaction. In this manner, inter-proxy communications are enabled via an existing protocol (e.g., HTTP) that is used in the request-response transaction so that proxies can communicate with one another pertaining to matters (e.g., maintenance schedule) unrelated to the original intent of the transaction using the existing protocol (e.g., HTTP).

20 Claims, 5 Drawing Sheets

(51) Int. Cl.
*H04L 67/02* (2022.01)
*H04L 67/01* (2022.01)
*H04L 67/60* (2022.01)

(58) Field of Classification Search
CPC ... H04L 29/0653; H04L 69/161; H04L 69/22; H04L 67/28; H04L 2209/76; H04L 29/08702; H04L 29/1282; H04L 61/2528; H04L 61/6013; H04L 67/561; H04L 67/01; H04L 67/60
USPC ............................... 709/245, 203, 236, 230
See application file for complete search history.

(56) References Cited

U.S. PATENT DOCUMENTS

| | | | |
|---|---|---|---|
| 6,889,294 | B1 | 5/2005 | Nichols et al. |
| 7,257,837 | B2 | 8/2007 | Xu et al. |
| 7,315,888 | B2 | 1/2008 | Shibata |
| 7,340,047 | B2 | 3/2008 | Fijolek et al. |
| 7,457,289 | B2 | 11/2008 | Wang |
| 7,966,404 | B2 | 6/2011 | Hedin et al. |
| 9,479,807 | B1 | 10/2016 | Bugajski et al. |
| 9,654,329 | B2 | 5/2017 | Chan et al. |
| 10,158,570 | B2 | 12/2018 | Moiseenko et al. |
| 11,153,399 | B2 * | 10/2021 | Marzorati ............... H04L 67/02 |
| 2002/0025046 | A1 | 2/2002 | Lin |
| 2002/0112076 | A1 | 8/2002 | Rueda et al. |
| 2002/0133582 | A1 | 9/2002 | Shibata |
| 2004/0114559 | A1 | 6/2004 | Wang |
| 2005/0033985 | A1 | 2/2005 | Xu et al. |
| 2005/0243991 | A1 | 11/2005 | Fijolek et al. |
| 2007/0245010 | A1 | 10/2007 | Arn et al. |
| 2008/0091812 | A1 | 4/2008 | Lev-Ran et al. |
| 2008/0254791 | A1 | 10/2008 | Oyama et al. |
| 2009/0310484 | A1 | 12/2009 | Sisalem et al. |
| 2015/0341467 | A1 | 11/2015 | Lim et al. |
| 2017/0373975 | A1 | 12/2017 | Moiseenko et al. |

OTHER PUBLICATIONS

Anonymous, "An Approach to Replay, Alter and Simulate Network Communication," IP.com No. IPCOM000235865D, Mar. 28, 2014, pp. 1-7.

Erickson et al., "Socially Translucent Systems: Social Proxies, Persistent Conversation, and the Design of "Babble"," IBM T.J. Watson Research Center, CHI '99, Pittsburgh, Pennsylvania, May 15-20, 1999, pp. 1-8.

Motorola et al., "Method for Interrupting Transmitting Half-Duplex Device," IP.com No. IPCOM000242528D, Jul. 22, 2015, pp. 1-5.

Petersson et al., "Forwarded HTTP Extension," Internet Engineering Task Force (IETF), Jun. 2014, pp. 1-32.

Reed et al., "Proxies for Anonymous Routing," 12th Annual Computer Security Applications Conference, San Diego, CA, Dec. 9-13, 1996, pp. 1-11.

* cited by examiner

FACILITATING INTER-PROXY COMMUNICATION VIA AN EXISTING PROTOCOL

TECHNICAL FIELD

The present invention relates generally to communications over a computer network, and more particularly to facilitating inter-proxy communication via an existing protocol (e.g., HTTP).

BACKGROUND

Communications over a computer network may involve communications between a "client" and a "server," where the "client" requests a resource or service and the "server" provides the requested resource or service (referred to as the "client-server computing model").

In computer networks, a "proxy" (including a "proxy server," a "forward proxy" and a "reverse proxy") is used to facilitate communication between the clients and the servers. That is, the proxy acts as an intermediary for requests from clients seeking resources or services from servers as well as facilitates the delivery of the requested resource or service. For example, a client may connect to a proxy requesting a service, such as a file, connection, web page, or other resource available from a server. The proxy may determine if it can fulfill the request. By the proxy fulfilling the request, performance is improved by not utilizing the processing resources of the server for processing the request. If, however, the proxy cannot fulfill the request, then the proxy provides the requested resource by connecting to the server and requesting the service from the server on behalf of the client. For instance, a proxy may correspond to a web proxy which facilitates access to content on the World Wide Web.

At times, there may be multiple interconnected proxies that are used to facilitate communication between the clients and the servers. For example, there may be a proxy receiving a request message from the client which is forwarded to one or more other proxies. The proxy connected to the server may then request the server to process the message if it cannot fulfill the request.

One protocol that is used to facilitate communication between clients and servers is the Hypertext Transfer Protocol (HTTP), which functions as a request-response protocol in a client-server computing model as discussed above. A web browser, for example, may be the client and an application running on a computer hosting a website may be the server. The client submits an HTTP request message to the server, which may be intercepted by a proxy, which may be forwarded to other proxies. In cases where a proxy cannot fulfill the request, the server provides the requested resources, such as Hypertext Markup Language (HTML) files and other content, or performs other functions on behalf of the client, returns a response message to the client via one or more proxies. The response contains completion status information about the request and may also contain the requested content in its message body.

Currently, in situations where there are multiple proxies used in the client-server computing model discussed above, proxies can only exchange information pertaining to the request message (e.g., HTTP request message) or the response message (e.g., HTTP response message). That is, proxies simply relay information on behalf of someone else, such as a client or a server. Proxies are not able to communicate with each other to exchange information that is not related to the request message or the response message during the process of facilitating communication between a client and a server using a protocol, such as HTTP. That is, there is no inter-proxy communication mechanism available whereby proxies are able to communicate with each other unrelated to the original intent of the transaction during the process of facilitating communication between a client and a server using a protocol, such as HTTP.

By not having such a mechanism, proxies need to specifically reference one another outside of the process for relaying information thereby wasting resources (processing resources) and network bandwidth.

SUMMARY

In one embodiment of the present invention, a computer-implemented method for facilitating inter-proxy communication via an existing protocol comprises receiving a message by a proxy using a protocol. The method further comprises defining a new message header for the inter-proxy communication. The method additionally comprises adding the new message header to an existing header section of the message. Furthermore, the method comprises adding an action item and/or a notification in the newly added message header of the message, where the action item and the notification are only relevant for one or more subsequent proxies.

Other forms of the embodiment of the method described above are in a system and in a computer program product.

The foregoing has outlined rather generally the features and technical advantages of one or more embodiments of the present invention in order that the detailed description of the present invention that follows may be better understood. Additional features and advantages of the present invention will be described hereinafter which may form the subject of the claims of the present invention.

BRIEF DESCRIPTION OF THE DRAWINGS

A better understanding of the present invention can be obtained when the following detailed description is considered in conjunction with the following drawings, in which.

DETAILED DESCRIPTION

The present invention comprises a method, system and computer program product for facilitating inter-proxy communication via an existing protocol. In one embodiment of the present invention, a proxy receives a message, such as a request message from a client or a response message from a server, using a protocol, such as HTTP. If the proxy determines to add "proxy relevant information" to the message, then the proxy defines a new message header for the inter-proxy communication (communication between the proxies), which is added to the existing header section of the message. The proxy relevant information is then added in the newly added message header of the message, which is to be utilized by the subsequent proxy or subsequent proxies. "Proxy relevant information," as used herein, refers to information that is only relevant to the inter-proxy communication and is not relevant to the underlying request-response transaction. The message with the proxy relevant information is then transmitted to a subsequent proxy using the protocol of the underlying request-response transaction. In this manner, inter-proxy communications are enabled via an existing protocol (e.g., HTTP) that is used in the request-response transaction so that proxies can communicate with one another pertaining to matters (e.g., maintenance schedule, current load, software update) unrelated to the original intent of the transaction using the existing protocol (e.g., HTTP).

In the following description, numerous specific details are set forth to provide a thorough understanding of the present invention. However, it will be apparent to those skilled in the art that the present invention may be practiced without such specific details. In other instances, well-known circuits have been shown in block diagram form in order not to obscure the present invention in unnecessary detail. For the most part, details considering timing considerations and the like have been omitted inasmuch as such details are not necessary to obtain a complete understanding of the present invention and are within the skills of persons of ordinary skill in the relevant art.

While the following discusses the present invention in connection with utilizing the HTTP protocol which allows for experimental headers (e.g., prepend X-), the principles of the present invention may utilize any extensible protocol, such as Simple Mail Transfer Protocol (SMTP). A person of ordinary skill in the art would be capable of applying the principles of the present invention to such implementations. Further, embodiments applying the principles of the present invention to such implementations would fall within the scope of the present invention.

Figure 1:
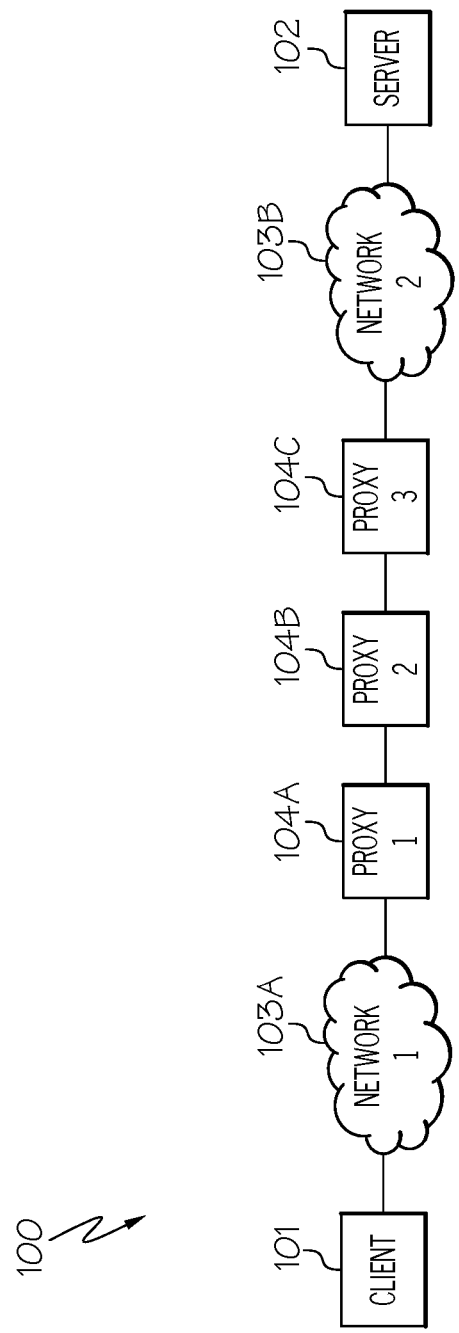
FIG. 1 illustrates a communication system for practicing the principles of the present invention in accordance with an embodiment of the present invention.

Referring now to the Figures in detail, FIG. 1 illustrates a communication system 100 for practicing the principles of the present invention in accordance with an embodiment of the present invention. Communication system 100 includes a client 101 connected to a server 102 via one or more networks 103A-103B and one or more proxies, such as proxies 104A-104C. Networks 103A-103B ("Network 1" and "Network 2," respectively) may collectively or individually be referred to as networks 103 or network 103, respectively. Proxies 104A-104C ("Proxy 1," "Proxy 2," and "Proxy 3," respectively) may collectively or individually be referred to as proxies 104 or proxy 104, respectively.

Client 101, as used herein, may refer to any computing device (e.g., a portable computing unit, a Personal Digital Assistant (PDA), a mobile device, a tablet personal computer, a smartphone, a laptop computer, a mobile phone, a cellular phone, a navigation device, a gaming unit, a desktop computing device, a workstation, an Internet appliance and the like) configured with the capability of connecting to a network 103 and consequently communicating with server 102 via proxies 104.

Client 101, as used herein, may also refer to the application running on a computing device that issues a request message, requesting a resource or service from server 102.

Server 102, as used herein, refers to any computing device or application configured with the ability to fulfill the client's request and issue a response message containing the requested resource or service.

Proxy 104, as used herein, refers to any computing device or application that is used to facilitate communication between client 101 and server 102. That is, proxy 104 acts as an intermediary for requests from clients 101 seeking resources or services from servers 102 as well as facilitates the delivery of the requested resource or service. Proxy 104 may be any type of proxy, including, but not limited to, a "proxy server," a "forward proxy" or a "reverse proxy." A description of the hardware configuration of proxy 104 is provided below in connection with FIG. 2.

Network 103 may be, for example, a local area network, a wide area network, a wireless wide area network, a circuit-switched telephone network, a Global System for Mobile Communications (GSM) network, a Wireless Application Protocol (WAP) network, a WiFi network, an IEEE 802.11 standards network, various combinations thereof, etc. Other networks, whose descriptions are omitted here for brevity, may also be used in conjunction with system 100 of FIG. 1 without departing from the scope of the present invention.

While system 100 illustrates two networks 103A, 103B, system 100 may include any number of networks, which may be utilized by any number of devices. For example, while FIG. 1 illustrates two networks 103, there may be an additional network(s) between proxies 104. Furthermore, while FIG. 1 illustrates two networks, there may be a single network 103 utilized in system 100.

Furthermore, system 100 is not to be limited in scope to any particular number of proxies 104. Furthermore, system 100 is not to be limited in scope to any particular number of clients 101 or servers 102.

Figure 2:
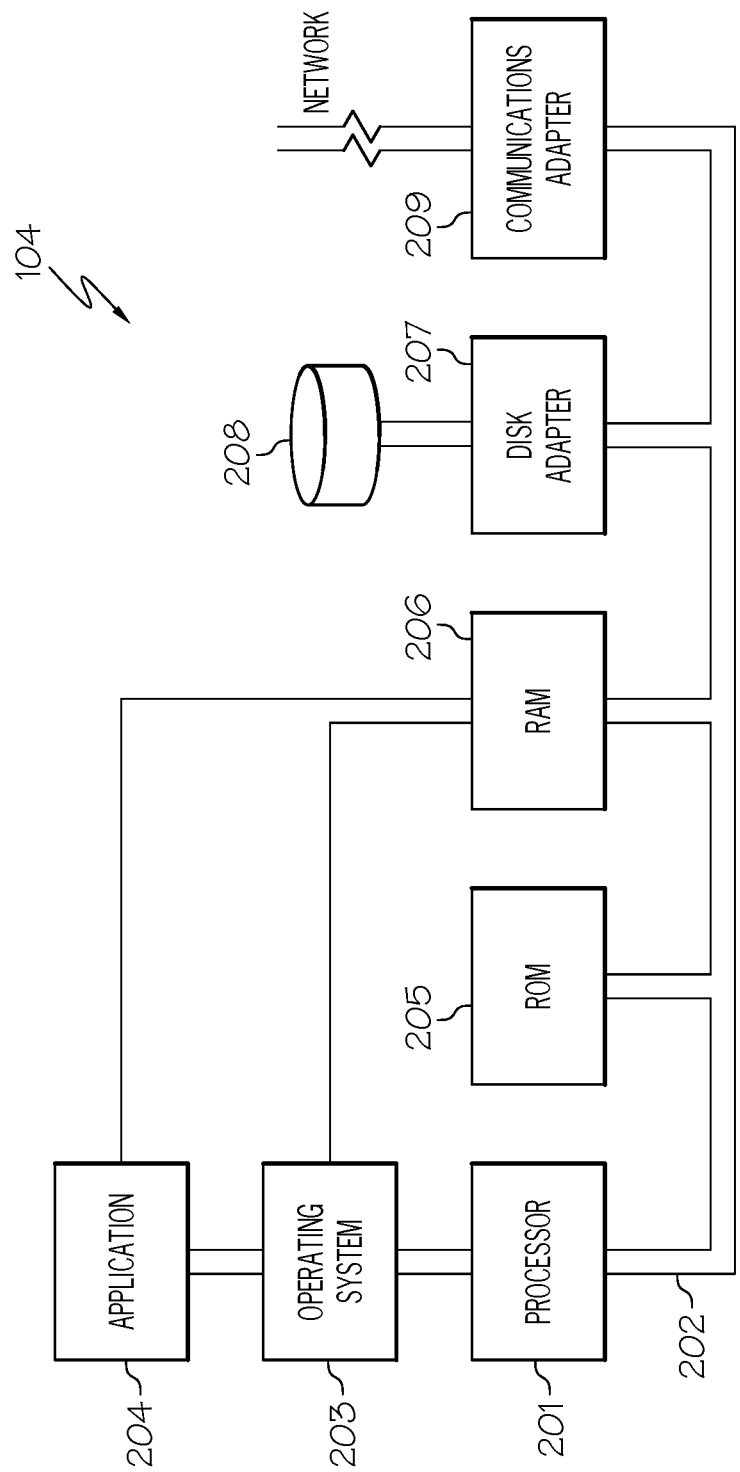
FIG. 2 illustrates an embodiment of the present invention of a hardware configuration of a proxy which is representative of a hardware environment for practicing the present invention.

Referring now to FIG. 2, FIG. 2 illustrates a hardware configuration of proxy 104 (FIG. 1) which is representative of a hardware environment for practicing the present invention. Referring to FIG. 2, proxy 104 has a processor 201 connected to various other components by system bus 202. An operating system 203 runs on processor 201 and provides control and coordinates the functions of the various components of FIG. 2. An application 204 in accordance with the principles of the present invention runs in conjunction with operating system 203 and provides calls to operating system 203 where the calls implement the various functions or services to be performed by application 204. Application 204 may include, for example, a program for facilitating inter-proxy communication via an existing protocol as discussed below in connection with FIGS. 3-5.

Referring again to FIG. 2, read-only memory ("ROM") 205 is connected to system bus 202 and includes a basic input/output system ("BIOS") that controls certain basic functions of proxy 104. Random access memory ("RAM") 206 and disk adapter 207 are also connected to system bus 202. It should be noted that software components including operating system 203 and application 204 may be loaded into RAM 206, which may be proxy's 104 main memory for execution. Disk adapter 207 may be an integrated drive electronics ("IDE") adapter that communicates with a disk unit 208, e.g., disk drive. It is noted that the program for facilitating inter-proxy communication via an existing protocol, as discussed below in connection with FIGS. 3-5, may reside in disk unit 208 or in application 204.

Proxy 104 may further include a communications adapter 209 connected to bus 202. Communications adapter 209 interconnects bus 202 with an outside network (e.g., network 103 of FIG. 1) thereby allowing proxy 104 to communicate with client 101, server 102 and other proxies 104.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As stated in the Background section, at times, currently, in situations where there are multiple proxies used in the client-server computing model discussed above, proxies can only exchange information pertaining to the request message (e.g., HTTP request message) or the response message (e.g., HTTP response message). That is, proxies simply relay information on behalf of someone else, such as a client or a server. Proxies are not able to communicate with each other to exchange information that is not related to the request message or the response message during the process of facilitating communication between a client and a server using a protocol, such as HTTP. That is, there is no inter-proxy communication mechanism available whereby proxies are able to communicate with each other unrelated to the original intent of the transaction during the process of facilitating communication between a client and a server using a protocol, such as HTTP. By not having such a mechanism, proxies need to specifically reference one another outside of the process for relaying information thereby wasting resources (processing resources) and network bandwidth.

Figure 3:
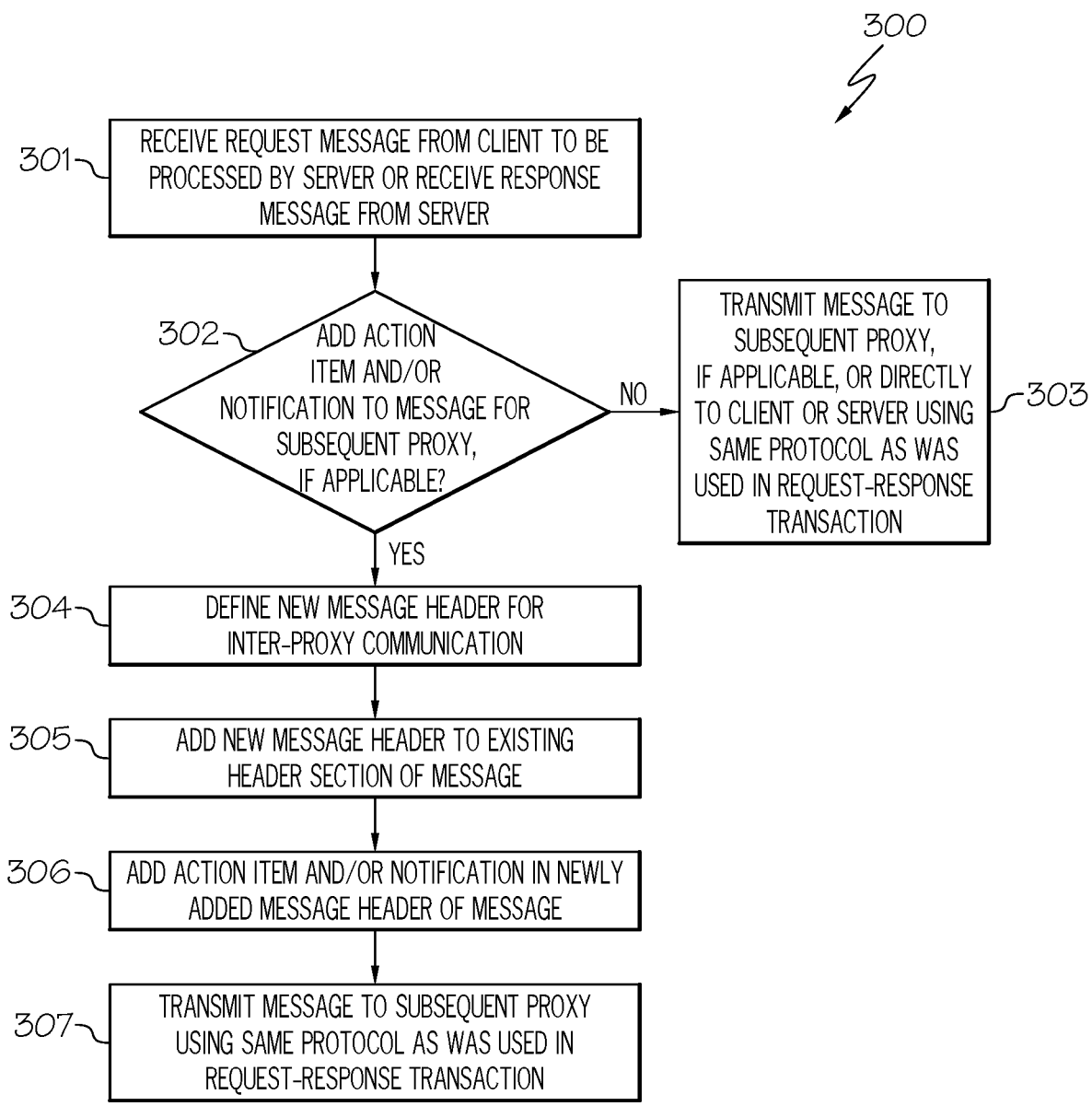
FIG. 3 is a flowchart of a method for handling a request message or a response message received directly from the client or server, respectively, in accordance with an embodiment of the present invention.
Figure 4:
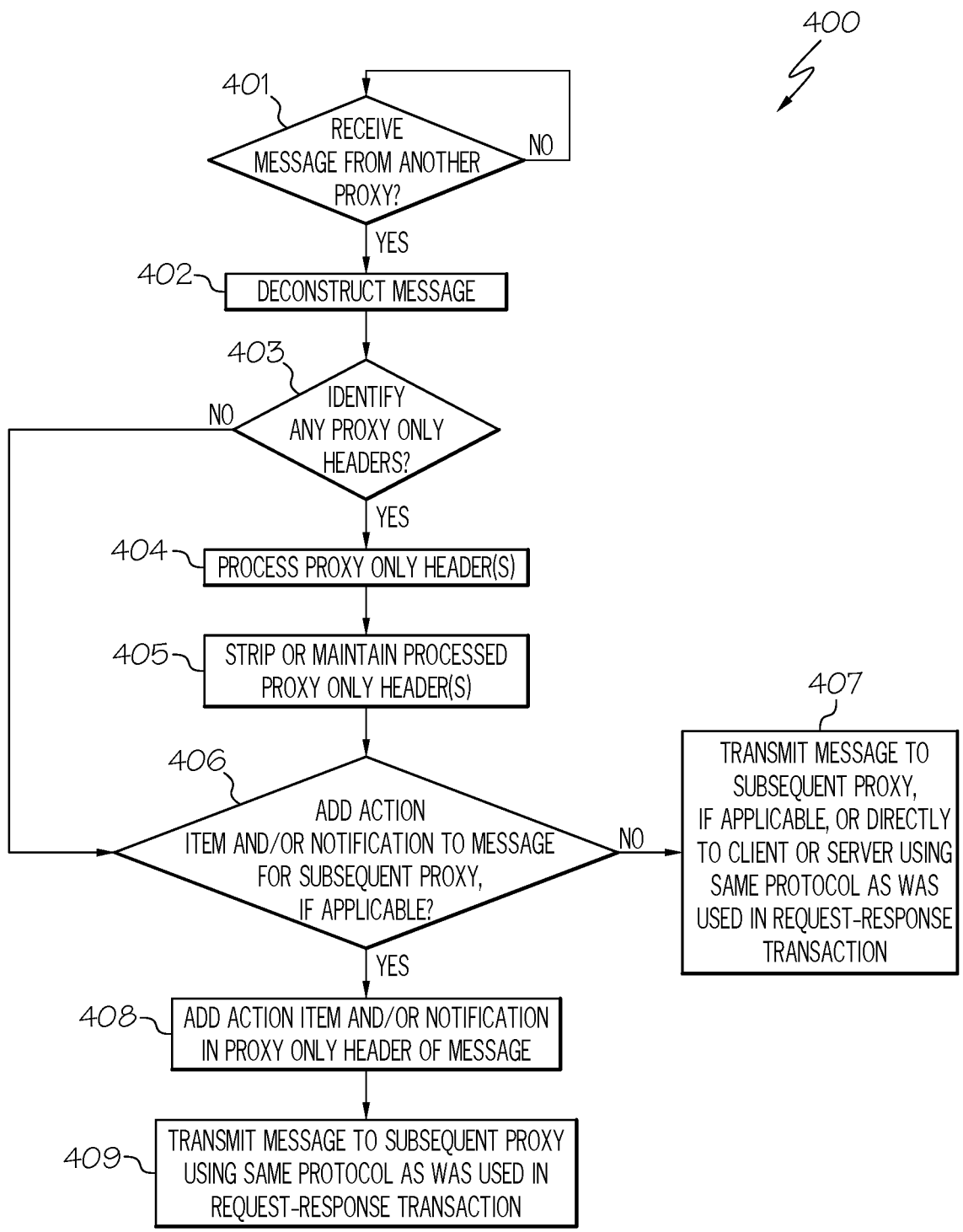
FIG. 4 is a flowchart of a method for handling a message provided by another proxy in accordance with an embodiment of the present invention.
Figure 5:
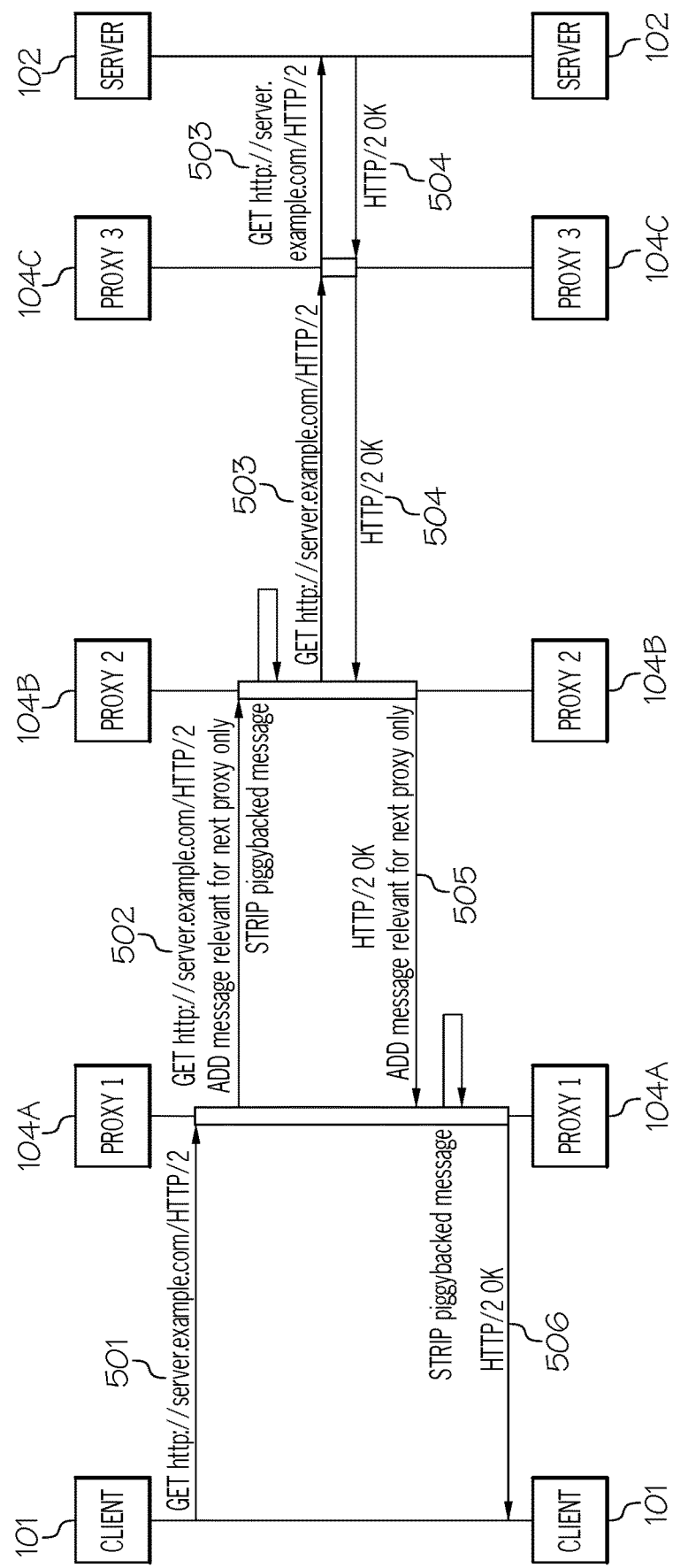
FIG. 5 is a schematic illustrating inter-proxy communication using the protocol of the request-response transaction in accordance with an embodiment of the present invention.

The embodiments of the present invention provide a means for enabling inter-proxy communication via an existing protocol (e.g., HTTP) so that proxies can communicate with one another pertaining to matters (e.g., maintenance schedule, current load, software update) unrelated to the original intent of the transaction using the existing protocol (e.g., HTTP) as discussed below in connection with FIGS. 3-5. FIG. 3 is a flowchart of a method for handling a request message or a response message received directly from the client or server, respectively. FIG. 4 is a flowchart of a method for handling a message (e.g., request message, response message) provided by another proxy. FIG. 5 is a schematic illustrating inter-proxy communication using the protocol of the request-response transaction.

As stated above, FIG. 3 is a flowchart of a method for handling a request message or a response message received directly from client 101 or server 102, respectively, in accordance with an embodiment of the present invention.

Referring to FIG. 3, in conjunction with FIGS. 1-2, in step 301, proxy 104 (e.g., proxy 104A) receives a request message (e.g., HTTP request message) from client 101 to be processed by server 102 using a protocol, such as HTTP, or proxy 104 (e.g., proxy 104C) receives a response message (e.g., HTTP response message) from server 102 using a protocol, such as HTTP. A "request message," as used herein, refers to a message requesting a resource or service, such as issued by client 101. A "response message," as used herein, refers to a message issued by server 102 that is responding to the request message, which may contain the complete status information about the request and may also contain the requested content (e.g., requested resource) in its message body.

In step 302, a determination is made by proxy 104 as to whether to add "proxy relevant information," such as an action item and/or notification, to the message (e.g., request message, response message) for the subsequent proxy 104, if applicable. That is, a determination is made by proxy 104 as to whether an action item and/or a notification are to be added to the message in case the message is being forwarded to a subsequent proxy 104. "Proxy relevant information," as used herein, refers to information that is only relevant to the inter-proxy communication and is not relevant to the underlying request-response transaction. An "action item," as used herein, refers to a task that needs to be accomplished, such as a scheduled maintenance. A "notification," as used herein, refers to a notice, request or warning, such as indicating the proxy's current load (e.g., number of processes waiting in the queue to access the processor), indicating that proxy 104 is currently in maintenance, and indicating that proxy 104 has received a patch/update (set of changes to a computer program or its supporting data designed to update, fix or improve the computer program). Such an action item and/or notification may be added to the request message or response message if the message needs to be transmitted to a subsequent proxy 104 (e.g., proxy 104B) or proxies 104 before the message is received by the server 102 or client 101 and if proxy 104 (e.g., proxy 104A) needs to communicate with the subsequent proxy 104 (e.g., proxy 104B) or proxies 104 with information that is only relevant to the subsequent proxy 104 or proxies 104. A "subsequent proxy," as used herein, refers to a proxy 104 that receives a message from a proxy 104 that needs to be forwarded to another proxy 104 or directly to client 101 or server 102. For instance, it may be beneficial for the subsequent proxies 104 to have knowledge when proxy 104 is undergoing maintenance so as to not issue requests to proxy 104 during the time it is undergoing maintenance thereby improving load balancing. In another example, it may be beneficial for the subsequent proxies 104 to have knowledge about a new patch/update, which may be beneficial for the subsequent proxy 104 as well. In a further example, the subsequent proxy 104 may also inform its administrator regarding updates received by other proxies 104. The administrator may then determine whether it would be beneficial for the subsequent proxy 104 to receive such an update as well. Such a notification may provide an extra layer of self-maintenance awareness to proxies 104.

In one embodiment, proxy 104 may consult a profile which includes an indication as to what types of information are to be added to the message (e.g., request message, response message). For instance, the profile may indicate that software patches/updates are to be included in the message to be forwarded to the subsequent proxy 104.

Referring to step 302, if proxy 104 determines to not add an action item and/or notification to the message (e.g., request message, response message), then, in step 303, proxy 104 transmits the message to a subsequent proxy 104, if applicable, or directly to client 101 or server 102 using the same protocol (e.g., HTTP) as was used in the request-response transaction. For example, if proxy 104B determines to not add an action item and/or notification to the message received from proxy 104A, then proxy 104B transmits the message to the subsequent proxy 104C. In another example, if proxy 104C determines to not add an action item and/or notification to the message received from proxy 104B, then proxy 104C transmits the message to server 102.

If, however, proxy 104 determines to add an action item and/or notification to the message for the subsequent proxy 104, then, in step 304, proxy 104 defines a new message header (referred to herein as the "proxy only header") for inter-proxy communication (communication between proxies 104) that is to be utilized by the subsequent proxy 104 or subsequent proxies 104. As will be discussed in greater detail below, by defining such a new message header, proxy 104 will be able to engage in inter-proxy communication utilizing the existing protocol (e.g., HTTP) being used by client 101 and server 102 in communicating amongst each other. That is, by defining such a new message header, proxy 104 will be able to piggyback on the existing protocol being used by client 101 and server 102 in a manner that allows proxies 104 to communicate amongst each pertaining to matters that are unrelated to the requested resource/service, such as current processing load, software updates, scheduled maintenance, etc.

In one embodiment, proxy 104 defines a new message header to be utilized in the HTTP protocol since the HTTP protocol allows for experimental headers (e.g., prepend X-). While the following discusses utilizing the HTTP protocol, the principles of the present invention may utilize any extensible protocol, such as Simple Mail Transfer Protocol (SMTP).

In step 305, proxy 104 adds the new message header to the existing header section of the message (e.g., HTTP request message), In step 306, proxy 104 adds "proxy relevant information," such as the action item and/or notification (e.g., date and time of scheduled maintenance), in the newly added message header of the message (e.g., HTTP request message).

In step 307, proxy 104 (e.g., proxy 104A) transmits the message to the subsequent proxy 104 (e.g., proxy 104B) using the same protocol (e.g., HTTP) as was used when proxy 104 received the message (e.g., request message from client 101, response message from server 102). That is, proxy 104 (e.g., proxy 104A) transmits the message to the subsequent proxy 104 (e.g., proxy 104B) using the same protocol (e.g., HTTP) as was used in the request-response transaction.

In one embodiment, the proxy relevant information is modeled after the DomainKeys Identified Mail (DKIM) protocol whereby a list of tag-value tuples are added to the proxy's response headers in the newly created message header (e.g., X-Proxy-Only header) utilizing the protocol (e.g., HTTP) used by client 101 and server 102. An example of a newly created message header that contains proxy relevant information is shown below.

X-Proxy-Only: maintainanceStart=1533715688; maintainanceEnd=1533722400;

In this example, proxy 104 piggybacks the original message by adding information about its next scheduled maintenance window. Such information is intended to be used by the subsequent proxy 104 or subsequent proxies 104 and will be ignored by client 101 or server 102 if such information is not stripped.

In one embodiment, the tag-value tuples within the messages (e.g., HTTP messages) might be used for inter-proxy communication purposes, such as shown below:

---

TAG=VALUE
maintainanceStart=unix timestamp in UTC
maintainanceEnd=unix timestamp in UTC
receivedPatchName=Linux w30117 2.6.32-696.30.1.e16.x86_64 #1 SMP Fri May 18 11:50:44 EDT 2018 x86_64 x86_64 x86_64 GNU/Linux
receivedPatchDate=unix timestamp in UTC
systemOverloadStart=unix timestamp in UTC
systemOverloadEnd=unix timestamp in UTC
workLoad=percentage

---

30

Upon proxy 104 receiving a message containing proxy relevant information, proxy 104 might strip the proxy only relevant header or add its own action item and/or notification before forwarding the message to the next recipient or simply forward the received action item and/or notification to the next recipient as discussed in further detail below. If such action items and/or notifications are not stripped from the message by the time it is received by client 101 or server 102, client 101 and server 102 will simply ignore those proxy relevant messages.

The description below describes an example of a proxy 104 (e.g., proxy 104A) receiving a request message (e.g., HTTP request message) from client 101. The client's request in the request message is prepended with ">" while the proxy's response is prepended with "<."

When the subsequent proxy 104 receives information about the non-availability of another proxy 104 due to its scheduled maintenance, the subsequent proxy 104 might use this information to avoid sending further requests to it during the given scheduled maintenance window or until further notice.

In another example, if the subsequent proxy 104 receives information about a newly applied patch on another proxy 104, it might notify its administrator if the patch is relevant for software running on proxy 104 and proxy 104 has not yet received the patch.

A discussion regarding a proxy 104 handling a message (e.g., request message, response message) provided by another proxy 104 is provided below in connection with FIG. 4.

---

```
> GET / HTTP/1.1
> Host: myibm.ibm.com
> User-Agent: curl/7.51.0
> Accept: */*
>
< HTTP/1.1 200 OK
< content-length: 907
< content-type: text/html
< p3p: CP="NON CUR OTPi OUR NOR UNI"
< server: Web SEAL/9.0.2.0
< x-content-type-options: nosniff
< cache-control: no-cache
< x-xss-protection: 1; mode=block
< referrer-policy: strict-origin-when-cross-origin
< strict-transport-security: max-age=31536000; includeSubDomains
< pragma: no-cache
< set-cookie: MYL-S-SESSION ID=0_/U2D1izlziiBfGg2/+51K4S2qPYHTA5PzG0hEx/OYo0rwCadM3c=; Path=/; Secure; HttpOnly
< set-cookie: NSC_JTBNQspyz-WT=ffffffff09ac4c7a45525d5f4f58455e445a4a42378b;path=/;secure;httponly
< x-proxy-only: maintainanceStart=1533715688; maintainanceEnd=1533722400;
```

FIG. 4 is a flowchart of a method 400 for handling a message (e.g., request message, response message) provided by another proxy 104 in accordance with an embodiment of the present invention.

Referring to FIG. 4, in conjunction with FIGS. 1-2, in step 401, a determination is made by proxy 104 as to whether it received a message from another proxy 104.

If proxy 104 did not receive a message from another proxy 104, then proxy 104 continues to determine whether it received a message from another proxy 104 in step 401.

If, however, proxy 104 received a message from another proxy 104, then, in step 402, proxy 104 deconstructs the message (e.g., request message, response message).

In step 403, a determination is made by proxy 104 as to whether it identifies any proxy only headers. A "proxy only header," as used herein, refers to headers in the message that contain information that is only relevant to proxies 104. Such information includes action items and/or notifications that are relevant for proxies 104 and are not related to the underlying message (e.g., request message, response message). Such proxy only headers are created by a previous proxy 104 to store proxy relevant information as discussed above in connection with steps 304-306 of FIG. 3.

If proxy 104 identified one or more proxy only headers, then, in step 404, proxy 104 processes the proxy only header(s), such as the exemplary "X-Proxy-Only" header discussed above. "Processing," as used herein, refers to analyzing the proxy only header to extract the action items and/or notifications placed in the proxy only header. Such action items and/or notifications may be analyzed and/or transmitted to an administrator for further analysis.

In step 405, proxy 104 strips or maintains the processed proxy only header(s). "Stripping," as used herein, refers to the removal of the processed proxy only header. For example, proxy 104 may reference a profile that indicates whether proxy only headers are to be stripped or maintained based on the information extracted from the proxy only header. For instance, a profile may indicate that proxy only headers with scheduled maintenance times are to be maintained; whereas, proxy only headers with current load data are to be stripped.

In one embodiment, proxy 104 may simply strip some of the information in the proxy only header while leaving the remaining information in the proxy only header to be examined by a subsequent proxy 104. For example, proxy 104 may strip the current load data in the proxy only header leaving the scheduled maintenance time for the prior proxy 104 in the proxy only header to be examined by a subsequent proxy 104.

Referring to steps 403 and 405, if proxy 104 did not identify any proxy only headers in the received message or upon stripping or maintaining the processed proxy only header(s), then in step 406, a determination is made by proxy 104 as to whether to add an action item and/or notification to the message for the subsequent proxy 104, if applicable.

In one embodiment, proxy 104 may consult a profile which includes an indication as to what types of information are to be added to the message (e.g., request message, response message). For instance, the profile 104 may indicate that software patches/updates are to be included in the message to be forwarded to the subsequent proxy 104.

Referring to step 406, if proxy 104 determines to not add an action item and/or notification to the message (request message or response message), then, in step 407, proxy 104 transmits the message to a subsequent proxy 104, if applicable, or directly to client 101 or server 102 using the same protocol (e.g., HTTP) as was used in the request-response transaction. For example, if proxy 104C determines to not add an action item and/or notification to the message received from proxy 104B, then proxy 104C transmits the message to server 102. In another example, if proxy 104B determines to not add an action item and/or notification to the message received from proxy 104C, then proxy 104B transmits the message to proxy 104A.

If, however, proxy 104 determines to add an action item and/or notification to the message for the subsequent proxy 104, then, in step 408, proxy 104 adds the action item and/or notification (e.g., date and time of scheduled maintenance, overall state of proxy) in the proxy only header of the message (e.g., HTTP request message).

In step 409, proxy 104 (e.g., proxy 104B) transmits the message to the subsequent proxy 104 (e.g., proxy 104A) using the same protocol (e.g., HTTP) as was used in the request-response transaction.

In this manner, inter-proxy communications are enabled via an existing protocol (e.g., HTTP) that is used in the request-response transaction so that proxies can communicate with one another pertaining to matters (e.g., maintenance schedule, current load, software update) unrelated to original intent of the transaction using the existing protocol (e.g., HTTP).

An illustration of enabling inter-proxy communications using the principles of the present invention is provided in FIG. 5.

FIG. 5 is a schematic illustrating inter-proxy communication using the protocol of the request-response transaction in accordance with an embodiment of the present invention.

Referring to FIG. 5, in conjunction with FIGS. 1-4, client 101 issues a request message 501 (e.g., "GET http://server.example.com/HTTP/2"), which is received by proxy 104A ("Proxy 1"). Proxy 104A then adds a message (e.g., current load time) relevant for the subsequent proxy 104B ("Proxy 2") in a proxy only header created by proxy 104A forming a message 502 that includes both the client's request and the proxy relevant information that utilizes the protocol (e.g., HTTP) of the request-response transaction.

Message 502 is then transmitted to the subsequent proxy 104B (e.g., "Proxy 2") by proxy 104A, where proxy 104B strips the piggybacked message forming a message 503 that only includes the client's request (e.g., "GET http://server.example.com/HTTP/2"). That is, proxy 104B strips the proxy only header containing the proxy relevant information. Alternatively, proxy 104B could retain the proxy only header with the proxy relevant information and/or add proxy relevant information itself.

In the scenario in which proxy 104B simply strips the piggybacked message forming message 503, proxy 104B forwards message 503 to proxy 104C ("Proxy 1") which may simply forward message 503 to server 102 to be serviced.

Furthermore, as illustrated in FIG. 5, proxy 104C receives the response message 504 (e.g., "HTTP/2 OK") from server 102 which may be forwarded to the subsequent proxy 104, proxy 104B, which adds a message (e.g., scheduled maintenance time) relevant for the subsequent proxy 104A in a proxy only header created by proxy 104B forming a message 505 that includes both the server's response and the proxy relevant information that utilizes the protocol (e.g., HTTP) of the request-response transaction.

Message 505 is then transmitted to the subsequent proxy 104A by proxy 104B, where proxy 104A strips the piggybacked message forming a message 506 that only includes the server's response (e.g., "HTTP/2 OK"). That is, proxy 104A strips the proxy only header containing the proxy relevant information. Proxy 104A may then forward the message 506 to client 101, which includes the server's response to the client's request.

In this manner, embodiments of the present invention provide inter-proxy communications via an existing protocol (e.g., HTTP) that is used in the request-response transaction so that proxies can communicate with one another pertaining to matters (e.g., maintenance schedule, current load, software update) unrelated to the original intent of the transaction using the existing protocol (e.g., HTTP).

Furthermore, the present invention improves the technology or technical field involving communications. In situations where there are multiple proxies used in the client-server computing model discussed above, proxies can only exchange information pertaining to the request message (e.g., HTTP request message) or the response message (e.g., HTTP response message). That is, proxies simply relay information on behalf of someone else, such as a client or a server. Proxies are not able to communicate with each other to exchange information that is not related to the request message or the response message during the process of facilitating communication between a client and a server using a protocol, such as HTTP. That is, there is no inter-proxy communication mechanism available whereby proxies are able to communicate with each other unrelated to the original intent of the transaction during the process of facilitating communication between a client and a server using a protocol, such as HTTP. By not having such a mechanism, proxies need to specifically reference one another outside of the process for relaying information thereby wasting resources (processing resources) and network bandwidth.

The present invention improves such technology by enabling inter-proxy communications via an existing protocol (e.g., HTTP) that is used in the request-response transaction so that proxies can communicate with one another pertaining to matters (e.g., maintenance schedule, current load, software update) unrelated to the original intent of the transaction using the existing protocol (e.g., HTTP).

Furthermore, by enabling inter-proxy communications via an existing protocol, as opposed to having proxies specifically reference one another outside of the process for relaying information, processing resources are reduced while reducing network bandwidth. As a result, computer capabilities are improved.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A computer-implemented method for facilitating inter-proxy communication via a protocol, the computer-implemented method comprising:
   receiving a message by a proxy using said protocol;
   defining a new message header for said inter-proxy communication;
   adding said new message header to an existing header section of said message; and
   adding an action item and/or a notification in said newly added message header of said message, wherein said action item and said notification are only relevant for one or more subsequent proxies.

2. The computer-implemented method as recited in claim 1 further comprising:
   receiving said message containing said new message header by a second proxy of said one or more subsequent proxies;
   deconstructing said message; and
   processing said new message header.

3. The computer-implemented method as recited in claim 2 further comprising:
   stripping said new message header from said message; and
   transmitting said message to a further subsequent proxy, a client or a server without said new message header.

4. The computer-implemented method as recited in claim 2 further comprising:
   maintaining said new message header in said message; and
   transmitting said message to a further subsequent proxy, a client or a server with said new message header.

5. The computer-implemented method as recited in claim 2 further comprising:
   adding a second action item and/or a second notification in said newly added message header of said message, wherein said second action item and said second notification are only relevant for one or more further subsequent proxies; and
   transmitting said message to a third proxy of said one or more further subsequent proxies.

6. The computer-implemented method as recited in claim 1, wherein said message is a request message from a client to be processed by a server.

7. The computer-implemented method as recited in claim 1, wherein said message is a response message from a server.

8. A computer program product for facilitating inter-proxy communication via a protocol, the computer program product comprising one or more computer readable storage mediums having program code embodied therewith, the program code comprising programming instructions for:
   receiving a message by a proxy using said protocol;
   defining a new message header for said inter-proxy communication;
   adding said new message header to an existing header section of said message; and
   adding an action item and/or a notification in said newly added message header of said message, wherein said action item and said notification are only relevant for one or more subsequent proxies.

9. The computer program product as recited in claim 8, wherein the program code further comprises the programming instructions for:
   receiving said message containing said new message header by a second proxy of said one or more subsequent proxies;
   deconstructing said message; and
   processing said new message header.

10. The computer program product as recited in claim 9, wherein the program code further comprises the programming instructions for:
    stripping said new message header from said message; and
    transmitting said message to a further subsequent proxy, a client or a server without said new message header.

11. The computer program product as recited in claim 9, wherein the program code further comprises the programming instructions for:
 maintaining said new message header in said message; and
 transmitting said message to a further subsequent proxy, a client or a server with said new message header.

12. The computer program product as recited in claim 9, wherein the program code further comprises the programming instructions for:
 adding a second action item and/or a second notification in said newly added message header of said message, wherein said second action item and said second notification are only relevant for one or more further subsequent proxies; and
 transmitting said message to a third proxy of said one or more further subsequent proxies.

13. The computer program product as recited in claim 8, wherein said message is a request message from a client to be processed by a server.

14. The computer program product as recited in claim 8, wherein said message is a response message from a server.

15. A system, comprising:
 a memory for storing a computer program for facilitating inter-proxy communication via a protocol; and
 a processor connected to said memory, wherein said processor is configured to execute program instructions of the computer program comprising:
  receiving a message by a proxy using said protocol;
  defining a new message header for said inter-proxy communication;
  adding said new message header to an existing header section of said message; and
  adding an action item and/or a notification in said newly added message header of said message, wherein said action item and said notification are only relevant for one or more subsequent proxies.

16. The system as recited in claim 15, wherein the program instructions of the computer program further comprise:
 receiving said message containing said new message header by a second proxy of said one or more subsequent proxies;
 deconstructing said message; and
 processing said new message header.

17. The system as recited in claim 16, wherein the program instructions of the computer program further comprise:
 stripping said new message header from said message; and
 transmitting said message to a further subsequent proxy, a client or a server without said new message header.

18. The system as recited in claim 16, wherein the program instructions of the computer program further comprise:
 maintaining said new message header in said message; and
 transmitting said message to a further subsequent proxy, a client or a server with said new message header.

19. The system as recited in claim 16, wherein the program instructions of the computer program further comprise:
 adding a second action item and/or a second notification in said newly added message header of said message, wherein said second action item and said second notification are only relevant for one or more further subsequent proxies; and
 transmitting said message to a third proxy of said one or more further subsequent proxies.

20. The system as recited in claim 15, wherein said message is a request message from a client to be processed by a server.

\* \* \* \* \*